(No Model.)　　　　　　　　　　　　　　　　2 Sheets—Sheet 1.
D. C. CREGIER.
PRESSURE REGULATOR FOR WATER SUPPLY MAINS.
No. 359,315.　　　Fig. 1.　　　Patented Mar. 15, 1887.
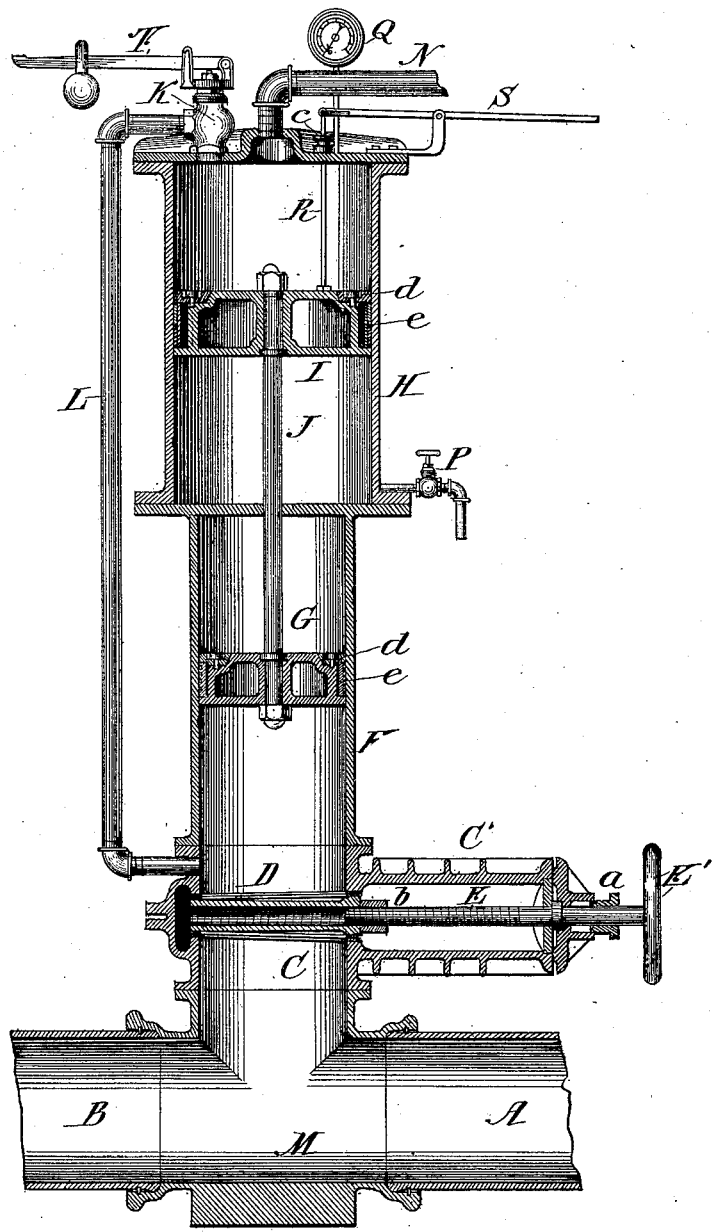
Witnesses:
O. W. Bond
Harry T. Jones
Inventor:

(No Model.) 2 Sheets—Sheet 2.
D. C. CREGIER.
PRESSURE REGULATOR FOR WATER SUPPLY MAINS.
No. 359,315. Patented Mar. 15, 1887.
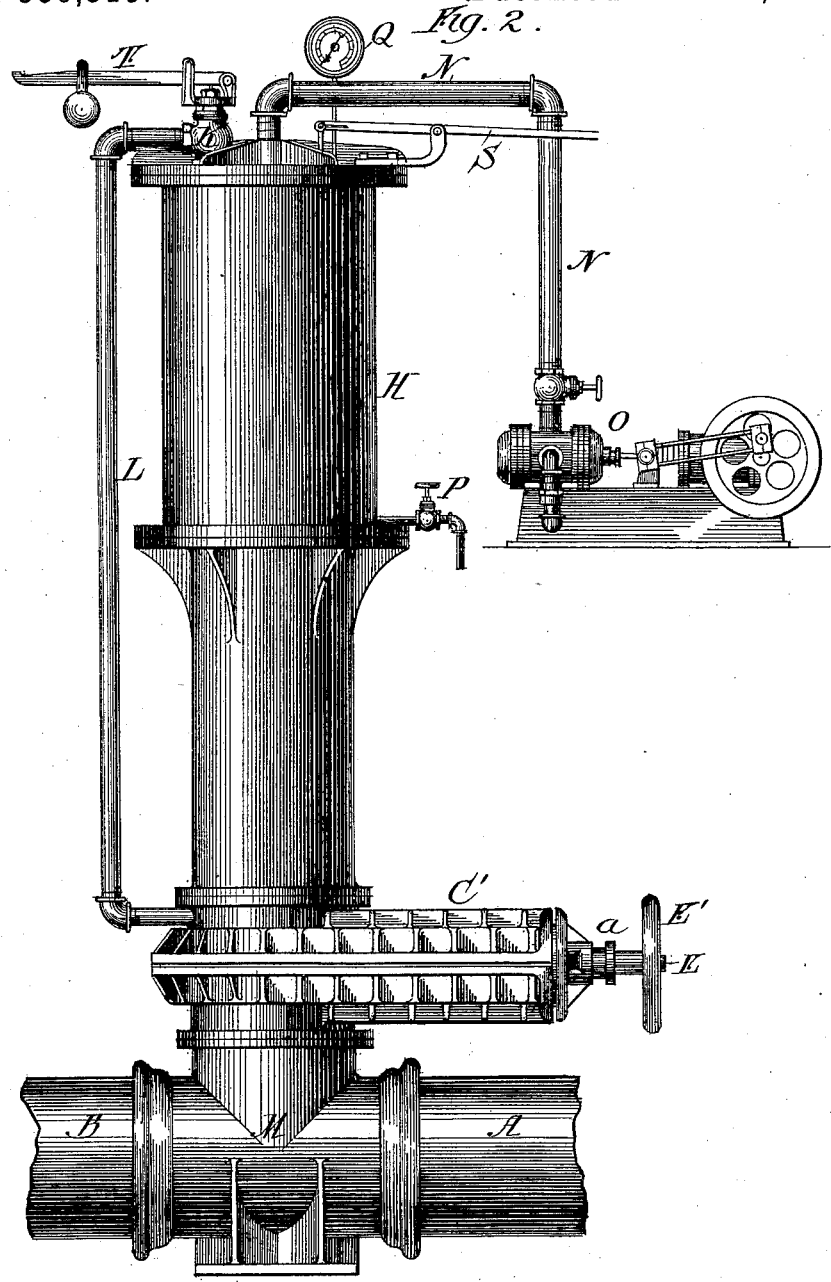
Witnesses:
O. W. Bond
Harry T. Jones
Inventor:

United States Patent Office.

DEWITT C. CREGIER, OF CHICAGO, ILLINOIS.

PRESSURE-REGULATOR FOR WATER-SUPPLY MAINS.

SPECIFICATION forming part of Letters Patent No. 359,315, dated March 15, 1887.

Application filed August 16, 1886. Serial No. 211,087. (No model.)

*To all whom it may concern:*

Be it known that I, DEWITT C. CREGIER, residing at Chicago, in the county of Cook and State of Illinois, and a citizen of the United States, have invented a new and useful Improvement in Pressure-Regulators for Water-Supply Mains, of which the following is a full description, reference being had to the accompanying drawings, in which—

Figure 1 is a vertical section, and Fig. 2 is an elevation, showing an air-pump.

This invention relates to and has for its object to provide certain new and useful improvements for the operation of pumping-engines and to provide against the effects of the ram or pulsations due to the flow of water or other fluids in mains or pipes for the water-supply of cities and towns, and other purposes; and its nature consists in the several improvements and combinations of parts, hereinafter described, and claimed as new.

In the drawings, A represents a section of pipe leading from the pump; B, a main; C C', a valve case or section; D, a double-face gate; E, a screw-shaft; E', a hand-wheel; F, a water-cylinder; G, a piston; H, an air-cylinder; I, an air-piston; J, a connecting-rod; K, an escape for air-relief valve; L, a pipe leading from cylinder H to cylinder F; M, a base-section; N, an air-pipe leading from cylinder H to the air-pump; O, an air-pump; P, a drip-pipe; Q, an air-pressure gage; R, a rod connecting the piston I with the arm or rod S; S, an arm or rod connected with the governor of the engine or damper and smoke-stack, or both; T, a weighted lever; *a*, a packing or stuffing box for the shaft E; *b*, a screw nut or extension on the valve D; *c*, a packing or stuffing box for the rod R; *d*, an annulus or ring covering the piston-packing; *e*, the packing.

The base-section M and pipes A B are made in the usual manner, and are of a size suited to the location where they are to be used. The section C is fitted to the upper portion of the base M, and has a side extension, C', with an interior cavity sufficient to receive the valve D, so that the passage into the cylinder may be of the same diameter as the cylinder, or it may be restricted by the valve, as desired.

The valve D is operated by the screw-shaft E and wheel E', the shaft passing through the stuffing-box *a* and operating upon the screw-threaded extension or nut *b*. The wheel E' may be a hand-wheel, or it may be a spur-wheel operated by a pinion and a crank-shaft, which will be desirable for very large mains.

The cylinder F is usually of the same diameter as the main; but it may be of any desired diameter or length. The cylinder H is usually of a larger diameter than the cylinder F; but it may be of any desired diameter, and its length should be equal to that of the cylinder F. These cylinders are provided with the pistons G and I, which are connected together by the rod J, which passes through the head of the cylinder F. These pistons are provided with the packings *e*, which are made accessible by the detachable flat rings *d*.

The cylinder H is provided with a drip-pipe, P, for the outflow of any water which may escape into this cylinder, and the upper end of this cylinder is provided with a close cap or top, upon which is placed a relief or escape valve, K T, and, for convenience, the pipe L is connected with the bulb or stem of such valve near the cylinder-head. The pipe L passes down and connects with the cylinder F through the section C, or otherwise, as may be most convenient. The head of the cylinder H is also provided with a pipe, N, which leads to the air-pump O, and, as the air-pump may be of any suitable known form, its details are not shown or described.

The piston I is provided with a rod, R, which is attached thereto and passes through the packing-ring or stuffing-box *c*, and connects with the slotted end of the rod S, which rod may be supported upon the head, as shown, or by other suitable means. The rod or lever S is extended so as to work coincidently with the air-piston, and may be connected to the engine-governor, a damper in the smoke-pipe, or water or alarm bell, as shown in Patent No. 257,557, issued to me May 9, 1882, or in any other desirable and effectual manner, to control the steam or motor of the engine and variations in the head of water.

The parts shown are connected together by suitable flanges and bolts in the ordinary manner.

This apparatus occupies but little space, is largely automatic, and will meet all the conditions and requirements incident to the ordinary standing pipe of water-works, so far as the feature of a governor or regulator to the discharge of water is concerned, and is designed to supersede the gravity-regulator shown and described in the said Patent No. 257,557.

The cylinder F is operated by water and the cylinder H by air, and they are preferably made of different diameters. The piston G in the water-cylinder F is acted upon by whatever head or pressure of water may be necessary to supply the city or town, or other purpose for which it may be used, and the piston I of the air-cylinder H is preferably of such proportion as will compensate for the water-pressure with a reasonable pressure of air. Supposing the cylinder F to be twenty-four inches in diameter, the cylinder H thirty-six inches in diameter, and a head of water of one hundred and sixty-feet, we have a pressure of thirty-one thousand four hundred and fourteen pounds upon the piston G, which, supposing the weight of the pistons to be three hundred and sixty-nine pounds, would require a pressure of thirty-one thousand and forty-five pounds on the air-cylinder to establish an equilibrium; but these ratios may be varied to meet the several conditions under which the apparatus is used. By the use of a larger air-cylinder less pressure from the air-pump is required.

The operation of the apparatus is not confined to any particular pressure of water, as the device or apparatus can be made to operate under any and all variations of head, providing that the increase or decrease of the pressure of air is regulated to meet the head of water, which is done by means of the air-pump O, which is to be of sufficient power and capacity to furnish the desired air-pressure.

In pumping directly in mains or distribution-pipes there is more or less impact or ram, due to the non-elastic character of water, which causes much wear and tear and frequent damage to the operating machinery. The usual guard against this is standing pipes of great height, which are often erected in connection with pumping-works, so that the increased volume of water delivered during a certain part of a pump-stroke, instead of rebounding against valves or other parts, flows into this standing pipe, which acts as a relief, the water in such pipes always being in motion. My device or apparatus serves precisely the same purpose, but requires but little height, as the compressed air acts as an elastic medium or cushion to receive the action of the constantly-varying volume of water incident to the delivery of ordinary pumps, and the movement of the governing-pistons G and I will be slight and in proportion to the diameter of the air-piston.

By connecting the pipe L with the air and water cylinders, as shown, the surplus air from the air-cylinder is conveyed to the lower end of the water-cylinder, and, by the admission of this air under high pressure into the flowing water, the water will be aerated, and thereby purified in proportion to the volume and pressure of the air admitted.

It will be evident that the pipe L may be extended downward and make a direct connection with the main-pipe B.

In case of an extraordinary water-pressure—as, for example, fire-service or the like—the operation of the regulator would not be an obstruction, since the piston may be forced against the cylinder-head and remain at rest. Then the operation of the pumping-engine would be the same as if my apparatus were not in connection.

What I claim as my invention, and desire to secure by Letters Patent, is—

1. The combination, with the receiving and discharge pipes A B and base M, of the water-cylinder F, air-cylinder H, and pistons G I, substantially as described.

2. The air-piston I, in combination with the cylinder H, connecting-rod J, and piston G, substantially as and for the purpose specified.

3. The combination of the cylinders F H and pistons G I with the pipe L, substantially as and for the purpose described.

4. The combination and arrangement of the cylinders F H, pistons G I, and rod J with the relief-valve K T and pipe L, substantially as set forth.

5. The combination of the piston I with the rod R and lever or rod S, substantially as and for the purpose specified.

6. The combination, with the cylinders F H, pistons G I, and pipe L, of the air-pump O and pipe N, substantially as described.

7. The combination of the stop-gate D with the section or case C C' and water-cylinder F, substantially as described.

8. The stop-gate D and section C C', in combination with the cylinders F H, pistons G I, and rod J, substantially as set forth.

9. The combination and arrangement of the gate D, section C C', cylinders F H, pistons G I, connecting-rod J, and pipe L with the air-pipe N, and water pipe or main A B, substantially as and for the purposes specified.

10. The herein-described method of regulating the pressure of water in mains or pipes for the water-supply of cities, preventing the effects of pulsations in said mains and pipes, and aerating the water therein, which consists in forcing a regulated supply of air into the air-cylinder of a water-pressure regulator and conducting the excess of air from said air-cylinder into the main or into the water-cylinder of the pressure-regulator, substantially as described.

DEWITT C. CREGIER.

Witnesses:
O. W. BOND,
HARRY T. JONES.